United States Patent Office 3,036,021
Patented May 22, 1962

3,036,021
PREPARATION OF POLYURETHANE PLASTICS
Victor Trescher, Leverkusen, Günther Loew, Koln, Detlef Delfs, Opladen, and Friedrich Möller, Leverkusen, Germany, assignors to Farbenfabriken Bayer Aktiengesellschaft, Leverkusen, Germany, a corporation of Germany
No Drawing. Filed Nov. 6, 1959, Ser. No. 851,244
Claims priority, application Germany Nov. 14, 1958
9 Claims. (Cl. 260—2.5)

This invention relates to a process for the production of cellular polyurethane plastics and more particularly to improved catalysts in the production of cellular polyurethane plastics.

It has been proposed heretofore to prepare cellular polyurethane plastics by reacting an organic polyisocyanate with an organic compound containing at least two active hydrogen containing groups in the presence of a blowing agent. Chemically inert blowing agents may be used or if desired, one may use a blowing agent such as water which reacts with the organic polyisocyanate to release carbon dioxide.

There are at least two known techniques for the production of cellular polyurethane plastics. One of these involves preparing a prepolymer in a first step by reacting an excess of an organic polyisocyanate with an organic compound containing at least two active hydrogen containing groups and subsequently reacting the prepolymer with water or other suitable cross-linking agent to prepare the cellular product. In this process the reactants are combined in two separate steps and, therefore, the relative rates of the chain extending reaction and the reaction which forms the cellular product are relatively unimportant. The other method involves the combination of the organic polyisocyanate, the organic compound containing active hydrogen containing groups and the blowing agent in a single step where the reaction to produce the chain extended polymer and the reaction to produce the cellular product proceed simultaneously. In this so called "one-shot" process, it is important to choose a suitable catalyst which will not only accelerate the reaction between the isocyanate groups and the active hydrogen containing groups, but one should be selected which will simultaneously adjust the rate of the gas producing reaction between water and an organic polyisocyanate, for example, so that a satisfactory product is obtained.

It is particularly difficult to achieve this simultaneous control of the two types of reactions where the organic compound containing active hydrogen containing groups is characterized by having predominantly secondary hydroxyl groups. Heretofore, tertiary amines have proved most satisfactory for this type of adjustment. They suffer from the disadvantage, however, of not being sufficiently active to control both types of reaction, where either polyesters or polyethers, for example, are employed as the organic compound containing predominantly secondary hydroxyl groups.

It is an object of this invention to provide an improved method of preparing cellular polyurethane plastics. Another object of this invention is to provide an improved process for the preparation of cellular polyurethane plastics derived from organic compounds containing secondary hydroxyl groups. A further object of the invention is to provide improved catalysts for the preparation of cellular polyurethane plastics. Still another object of the invention is to provide a method of making cellular polyurethane plastics in a single working step.

The foregoing objects and others which will become apparent from the following description are accomplished in accordance with this invention, generally speaking, by providing 1-aza-bicycloheptanes or 1-aza-bicyclooctanes as catalysts in the production of cellular polyurethane plastics. Thus, this invention contemplates the preparation of cellular polyurethane plastics by a process where an organic polyisocyanate, an organic compound containing at least two active hydrogen containing groups and a blowing agent are combined in the presence of a catalytic amount of a 1-aza-bicycloheptane or octane. These catalysts may be employed in either the prepolymer method or the one-shot technique; but they are most advantageously employed in the latter process. Thus, these catalysts not only accelerate the various simultaneously occurring reactions more strongly than the tertiary amines, but they also allow the use of organic compounds containing at least two active hydrogen containing groups which have lower reactivity than the heretofore usable compounds. Moreover, they make it possible to prepare cellular polyurethane plastics is a single working step from hydroxyl polyesters or polyhydric polyalkylene ethers which have predominantly secondary hydroxyl groups.

Any suitable 1-aza-bicycloheptane or octane may be used as the catalyst for these reactions, such as for example: 1-aza-bicyclo[2.2.2]octane, 1-aza-bicyclo[1.2.3] octane, 1-aza-bicyclo[1.2.2]heptane and their alkyl, amino, hydroxyl, nitro, alkoxy and halogen derivatives. Thus, other suitable compounds which may be used include: 7-methyl-1-aza-bicyclo[1.2.2]heptane, 3-methyl-1 - aza - bicyclo[2.2.2]octane, 2,6-dimethyl-1-azabicyclo [2.2.2]octane, 3 - ethoxy - 1-aza-bicyclo[2.2.2]octane, 7-methoxy-1-aza-bicyclo[1.2.2]heptane, 7-amino-1-aza-bicyclo-[1.2.2]heptane, 2-amino-1-aza-bicyclo[2.2.2]octane, 5-hydroxy-1-aza-bicyclo[1.2.2]heptane, 4-hydroxy-1-azabicyclo[2.2.2]octane, 7-nitro-1-aza-bicyclo[1.2.2]heptane, 3-nitro-1-aza-bicyclo[2.2.2]octane, 7-chloro-1-aza-bicyclo [1.2.2]heptane, 3-bromo-1-aza-bicyclo[2.2.2]octane. It is to be understood that the substituents set forth above may be on the outer ring or attached to the bridge members. These products may be prepared by known processes which may be found for example in U.S. Patent 2,192,840 to Prelog, issued March 5, 1940, and in Berichte 42, 124 (1909); Liebigs Annalen 420, 190 (1909) and Berichte 37, 3244 (1904). Also the substituted 1-aza-bicycloheptanes or octanes can be prepared in an analogous manner to the unsubstituted products for example from the corresponding substituted ethyl piperidines by conversion into the N-chlorides which enter into a ring closing reaction on exposure to ultraviolet light. Any suitable amount of these catalysts may be used but, of course, catalytic amounts are preferred and quantities within the range of about 0.01% to about 5% by weight are particularly useful and most preferred are amounts within the range of from about 0.1% to about 1% based on the weight of the reacting components.

Any suitable organic compound containing at least two active hydrogen containing groups as determined by the Zerewitinoff method may be used. Thus, suitable organic compounds containing at least two active hydrogen containing groups include, for example: hydroxyl polyesters, polyhydric polyalkylene ethers, hydroxyl polyester amides, hydroxyl polythioethers, reaction products of phenols and alkylene oxides, formaldehyde resins, hydrogenation products of olefine-carbon monoxide copolymers and epoxy resins. It is preferred to employ compounds having a molecular weight of at least about 500 and most preferred are those which have a molecular weight within the range of from about 1,000 to about 10,000. The hydroxyl number and acid number may vary over a wide range but it is preferred that the hydroxyl number fall within the range of from about 25 to about 150 and acid numbers below about 150 are preferred where applicable.

The polyesters may be prepared by the reaction of any suitable polyhydric alcohol with any suitable polycarboxylic acid. Suitable polyhydric alcohols include, for example: ethylene glycol, 1,3-propylene glycol, 1,4-butylene glycol, 1,5-amylene glycol, trimethylol propane, pentaerythritol and the like. Any suitable carboxylic acid may be used such as, for example, adipic acid, glutaric acid, succinic acid, malonic acid, oxalic acid, phthalic acid, terephthalic acid, pimelic acid, suberic acid, azelaic acid, sebacic acid and the like, as well as anhydrides thereof.

Any suitable polyhydric polyalkylene ether may be used such as are obtained, for example, from the condensation of alkylene oxides per se or mixtures thereof with a small amount of an active hydrogen containing compound such as, for example, one of the aforementioned polyhydric alcohols used in the preparation of the hydroxyl polyesters or water. Any suitable alkylene oxide may be used such as, for example, ethylene oxide, propylene oxide, butylene oxide, amylene oxide, 1,4-dioxane, tetrahydrofuran and the like. The polyhydric polyalkylene ethers may be prepared by the process disclosed by Wurtz in 1859, for example or by processes disclosed in Encyclopedia of Chemical Technology, volume 7, pages 257-262, published by Interscience Publishers, Inc., 1951, or in U.S. Patent 1,922,459.

Any suitable polyester amide may be used such as, for example, the reaction product of one of the aforementioned polyhydric alcohols or amino alcohols such as, for example, ethanolamine, with one of the aforementioned polycarboxylic acids and/or a polyamine such as, for example, ethylene diamine, 1,3-propylene diamine and the like.

Any suitable polythioether may be used such as, for example, the condensation product of a thioglycol such as, for example, bis(beta-hydroxy ethyl) sulfide per se or mixtures thereof with polyhydric alcohols and/or alkylene oxides, as more particularly set forth above.

Any suitable condensation product of a phenol and an alkylene oxide may be used such as, for example, the condensation product of cresol or 4,4'-isopropylidenediphenol with one of the aforementioned alkylene oxides.

Any suitable formaldehyde resin may be used such as, for example, the condensation product of formaldehyde per se or a compound capable of yielding formaldehyde such as, for example, paraformaldehyde or reaction products thereof with the condensation products of alkylene oxides to prepare polyoxymethylene compounds having terminal hydroxyl groups.

Any suitable hydrogenation product of olefine-carbon monoxide copolymers may be used such as, for example, the hydrogenation product of an ethylene-propylene-carbon monoxide copolymer and others disclosed in U.S. Patent 2,839,478, issued to Wilms et al. June 17, 1958, and U.S. Patent 2,495,292, issued to Scott, January 24, 1950.

Any suitable epoxy resin which has been modified to contain hydroxyl groups may be used such as, for example, the condensation product of epichlorhydrin with the aforementioned polyhydric alcohols employed in preparing the polyesters or catechol, pyrogallol and the like.

Any suitable organic polyisocyanate may be used such as, for example, tetramethylene diisocyanate, hexamethylene diisocyanate, m-xylylene-1,3-diisocyanate, cyclohexane-1,4-diisocyanate, dicyclohexylmethane-4,4'-diisocyanate, m-phenylene diisocyanate, p-phenylene diisocyanate, 2,4-toluylene diisocyanate, 2,6-toluylene diisocyanate, 3-(a-isocyanatoethyl)-phenylisocyanate, 2,6-diethylbenzene-1,4-diisocyanate, diphenylmethane-4,4'-diisocyanate, diphenyl-dimethylmethane-4,4'-diisocyanate, 3,3'-dimethoxydiphenyl-methane-4,4'-diisocyanate and naphthalene-1,5-diisocyanate. It is also possible to use concurrently other polyfunctional polyisocyanates, for example, triphenyl methane triisocyanate. One may also use adducts of monohydroxy compounds and polyisocyanates such as, for example, the reaction product of 1 mol of a trihydric alcohol such as, for example, trimethylol propane with 3 mols of a diisocyanate such as, for example, 2,4-toluylene diisocyanate or those polyisocyanates which are for example used according to German Patents 1,022,789 and 1,027,394.

Any suitable blowing agent may be used such as, for example, water, dichlorodifluoromethane, trifluorochloromethane and the like.

Best results are obtained when the reaction components are combined in the presence of a silicone stabilizer. The preferred silicone stabilizers for those systems which employ polyesters are dimethyl siloxanes having a viscosity within the range from about 50 cp. to about 250 cp. The preferred silicone stabilizers for those systems which employ polyhydric polyalkylene ethers are siloxane oxyalkylene block copolymers having the formula

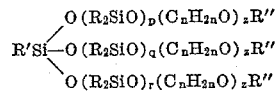

wherein R, R' and R'' are alkyl radicals having 1 to 4 carbon atoms; $p$, $q$ and $r$ each have a value of from 4 to 8 and $(C_nH_{2n}O)_z$ is a mixed polyoxyethylene oxypropylene group containing from 15 to 19 oxyethylene units and 11 to 15 oxypropylene units with $z$ equal to from about 26 to about 34 is particularly advantageous. Organo silicone compounds of this type and a method for making them are disclosed in U.S. Patent 2,834,748. Although all silicone compounds represented by the general formula given hereinbefore are broadly contemplated, best results have been obtained with a compound having the formula

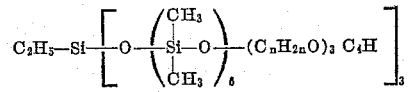

wherein $(C_nH_{2n}O)$ is a mixed polyoxyethylene and oxypropylene block copolymer containing about 17 oxyethylene units and about 13 oxypropylene units.

Other additives may also be included in the reaction mixture such as, for example, emulsifiers, for example, sulfonated castor oil, flame proofing agents such as trichloroethyl phosphate and dyestuffs.

The products of the present invention are useful in the heretofore known uses for cellular polyurethane plastics including the preparation of seat cushions, rug underlay, packaging material, upholstery, arm rests for the interior of vehicles, both thermal and sound insulation and in the production of toys, ornaments and the like.

The invention is further illustrated by the following examples in which the parts are by weight unless otherwise indicated.

*Example 1*

About 100 parts of a linear polypropylene glycol having a molecular weight of about 2,000 and an hydroxyl number of about 56 were combined with about 38 parts of a mixture of about 20% 2,6-toluylene diisocyanate and 80% 2,4-toluylene diisocyanate, about 0.5 parts of 1-aza-bicyclo[2.2.2]octane, about 1.5 parts of a silicone oil having the formula

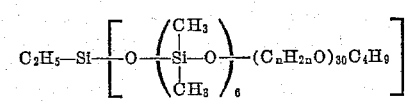

wherein $(C_nH_{2n}O)$ is a mixed polyoxyethylene and oxypropylene block containing about 17 oxyethylene units and about 13 oxypropylene units and about 2.9 parts of water in a mixer such as is disclosed for example in U.S. Reissue Patent 24,514 to Hoppe et al., issued August 12, 1958, and placed in a mold. The components were allowed to react and expanded to yield a cellular polyurethane plastic which had a density of about 38 kg./m.³.

Example 2

About 100 parts of a branched polyether being the condensation product of propylene oxide and trimethylol propane having a molecular weight of about 3,000 and a hydroxyl number of about 56 were combined with about 38 parts of a mixture of about 20% 2,6-toluylene diisocyanate and 80% 2,4-toluylene dissocyanate, about 0.5 part of 1-aza-bicyclo[1.2.2]heptane, about 1.5 parts of the silicone oil employed in Example 1 and about 2.9 parts of water in a mixer such as is disclosed for example in U.S. Reissue Patent 24,514 to Hoppe et al., issued August 12, 1959, and placed in a mold. The resulting product had good mechanical strength and was a highly elastic cellular polyurethane product with a density of about 35 kg./m.$^3$.

Example 3

About 100 parts by weight of a polyester prepared from 16 mols of adipic acid, 16 mols of diethylene glycol and 1 mol of trimethylol propane having an OH number of 56 and an acid number of about 1 were combined with about 38 parts by weight of a mixture of about 35% 2.6-toluylene diisocyanate and 65% of 2.4-toluylene diisocyanate, about 0.5 part by weight of 1-azabicyclo-[2.2.2.]octane, about 1.5 parts by weight of a sulphonated ricinoleic acid (54% water content), 1.5 parts by weight of the sodium salt of a sulphonated castor oil (54% water content), and about 1.4 parts by weight of water in a mixer such as is disclosed, for example, in U.S. Reissue Patent 24,514 to Hoppe et al., issued August 12, 1958, and placed in a mold. The components were allowed to react, and expanded to yield a cellular polyurethane plastic, having a density of about 35 kg./m.$^3$.

Example 4

100 parts by weight of the polyester of Example 3, 43 parts by weight of a mixture of about 35% 2,6-toluylene diisocyanate and 65% of 2,4-toluylene diisocyanate, 2.8 parts of water, 0.5 part of 1-aza-3-oxobicylo-[2,2,2]octane (prepared from 1-carboxymethyl-4-carbethoxypiperidine by Dieckmann-condensation and saponification and decarboxylation) and 1 part of the sodium salt of sulphonated castor oil (54% water content) are combined in a mixer such as is described, for example, in U.S. Reissue Patent 24,514. The mixture is discharged from the mixer and starts at once to expand to a cellular polyurethane plastic, having a density of about 60 kg./m.$^3$.

Example 5

100 parts by weight of the polyester of Example 3, 35 parts of the mixture of toluylene diisocyanates described in Example 4, 2.5 parts of water, 0.4 part of 1-aza-3-oxobicyclo[2,2,2]octane and 1 part of diethylamine oleate are rapidly and intimately mixed and the mixture placed in a mold. The mixture expands to yield a cellular polyurethane plastic having a density of 60 kg./m.$^3$ and the following mechanical properties:

| | | |
|---|---|---|
| Tensile strength | kg./cm.$^2$ | 1.7 |
| Elongation at break | percent | 200 |
| Elasticity | do | 39 |
| Hardness (ASTM D1055–52) | do | 40 |
| Compression | g./cm.$^2$ | 60 |
| Permanent elongation | percent | 7 |

Example 6

100 parts by weight of the polyester of Example 3, 43 parts by weight of the mixture of toluylene diisocyanates of Example 4, 1 part by weight of oleic acid, 3.3 parts of water and 0.3 part of 1-aza-5-methylbicyclo-[3,3,0]octane (prepared by hydrogenation of γ-nitro-γ-methyl pimelic acid diethyl ester) are thoroughly mixed. The mixture results in a soft elastic cellular polyurethane plastic having good damping properties.

Example 7

100 parts by weight of the polyester of Example 3, 43 parts by weight of the mixture of toluylene diisocyanates of Example 4, 3.3 parts by weight of water, 1 part by weight of oleic acid, and 0.2 part by weight of 1-aza-5-methylbicyclo[3,3,0]octane are combined in a mixer such as is disclosed, for example, in U.S. Reissue Patenlt 24,514, and placed in a mold. The components were allowed to react and expand to yield a cellular polyurethane plastic having a density of about 45 kg./m.$^3$. The resulting foam has a good damping property.

It is to be understood that any other suitable catalyst of the type described above, organic polyisocyanate, organic compound containing at least two active hydrogen containing groups and the like could have been used in the foregoing examples with equally satisfactory results.

Although the invention has been described in considerable detail in the foregoing, it is to be understood that many variations can be made by those skilled in the art without departing from the spirit and scope of the invention except as set forth in the claims.

What is claimed is:

1. In the preparation of a cellular polyurethane plastic by a process which comprises mixing an organic polyisocyanate with an organic compound containing at least two active hydrogen containing groups as determined by the Zerewitinoff method in the presence of a blowing agent, the improvement which comprises mixing said ingredients with a catalytic amount of a member selected from the class consisting of 1-aza-bicycloheptanes and 1-aza-bicyclooctanes.

2. In the preparation of a cellular polyurethane plastic by a process which comprises reacting an organic polyisocyanate with an organic compound containing at least two active hydrogen containing groups as determined by the Zerewitinoff method and water the improvement which comprises reacting said organic polyisocyanate with said organic compound containing at least two active hydrogen containing groups and water while said reactants are in admixture with a catalytic amount of a member selected from the class consisting of 1-aza-bicycloheptanes and 1-aza-bicyclooctanes.

3. In the preparation of cellular polyurethanes by a process which comprises reacting the condensation product of an alkylene oxide having a molecular weight of at least about 500, water and an organic polyisocyanate the improvement which comprises effecting said reaction with a catalyst selected from the group consisting of 1-aza-bicycloheptanes and 1-aza-bicyclooctanes.

4. In the preparation of cellular polyurethanes by a process which comprises reacting the condensation product of an alkylene oxide having a molecular weight of at least about 500, water and an organic polyisocyanate the improvement which comprises effecting the reaction with a catalyst selected from the group consisting of 1-aza-bicycloheptanes and 1-aza-bicyclooctanes and a stabilizer containing a siloxane-oxyalkylene block copolymer having the formula

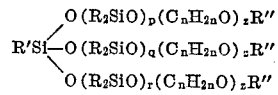

wherein R, R' and R'' are alkyl radicals having 1 to 4 carbon atoms; $p$, $q$ and $r$ each have a value of from 4 to 8 and $(C_nH_{2n}O)_z$ is a mixed polyoxyethylene oxypropylene block containing from 15 to 19 oxyethylene units and from 11 to 15 oxypropylene units with $z$ equal to from about 26 to about 34.

5. In the preparation of a cellular polyurethane plastic by a process which comprises reacting the condensation product of an alkylene oxide having a molecular weight of at least about 500, water and an organic polyisocyanate by mixing said components together in a single mixing step the improvement which comprises effecting said reaction with a catalyst selected from the group consisting of 1-aza-bicycloheptanes and 1-aza-bicyclooctanes and a stabilizer containing a siloxane-oxyalkylene block copolymer having the formula

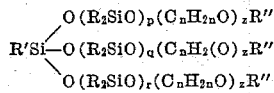

wherein R, R' and R" are alkyl radicals having 1 to 4 carbon atoms; $p$, $q$ and $r$ each have a value of from 4 to 8 and $(C_nH_{2n}O)_z$ is a mixed polyoxyethylene oxypropylene block containing from 15 to 19 oxyethylene units and from 11 to 15 oxypropylene units with $z$ equal to from about 26 to about 34.

6. The process of claim 5 wherein said siloxane-oxyalkylene block copolymer has the formula

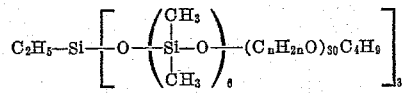

wherein $(C_nH_{2n}O)$ is a mixed polyoxyethylene and oxypropylene block containing about 17 oxyethylene units and about 13 oxypropylene units.

7. In the preparation of cellular polyurethane plastics by a process which comprises reacting an organic polyisocyanate with water and an organic compound containing at least two active hydrogen containing groups as determined by the Zerewitinoff method the improvement which comprises carrying out the reaction in a single step in the presence of a catalytic amount of 1-aza-bicyclo-[2.2.2]octane.

8. In the preparation of cellular polyurethane plastics by a process which comprises reacting an organic polyisocyanate with water and an organic compound containing at least two active hydrogen containing groups as determined by the Zerewitinoff method the improvement which comprises carrying out the reaction in a single step in the presence of catalytic amount of 1-aza-bicyclo[1.2.2]-heptane.

9. In the preparation of a cellular polyurethane plastic by a process which comprises reacting a member selected from the group consisting of hydroxyl polyesters obtained by a process which comprises condensing polyhydric alcohols and polycarboxylic acids, polyhydric polyalkylene ethers and polyhydric polythioethers, water and an organic polyisocyanate, the improvement which comprises effecting the reaction with from about 0.1 percent to about 5 percent by weight of a catalyst selected from the group consisting of 1-aza-bicycloheptanes and 1-aza-bicyclooctanes.

References Cited in the file of this patent

UNITED STATES PATENTS

| | | |
|---|---|---|
| 2,192,840 | Prelog | Mar. 5, 1940 |
| 2,650,212 | Windemuth | Aug. 25, 1953 |
| 2,834,748 | Bailey et al. | May 13, 1958 |

FOREIGN PATENTS

| | | |
|---|---|---|
| 795,335 | Great Britain | May 21, 1958 |

OTHER REFERENCES

Heiss et al.: "Ind. and Eng. Chem.," volume 46, No. 7, July 1954, pages 1498–1503.

Aylesworth et al.: "Modern Plastics," volume 35, No. 9, May 1958, pages 145, 146, 148, 150, 152 and 154.